(12) United States Patent
Matsufuji

(10) Patent No.: US 11,692,970 B2
(45) Date of Patent: Jul. 4, 2023

(54) LEAKAGE-FLUX FLAW DETECTION DEVICE

(71) Applicant: JFE Steel Corporation, Tokyo (JP)

(72) Inventor: Yasuhiro Matsufuji, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 109 days.

(21) Appl. No.: 17/605,672

(22) PCT Filed: Apr. 21, 2020

(86) PCT No.: PCT/JP2020/017218
§ 371 (c)(1),
(2) Date: Oct. 22, 2021

(87) PCT Pub. No.: WO2020/218301
PCT Pub. Date: Oct. 29, 2020

(65) Prior Publication Data
US 2022/0205949 A1 Jun. 30, 2022

(30) Foreign Application Priority Data
Apr. 24, 2019 (JP) .................................. 2019-082804

(51) Int. Cl.
*G01N 27/83* (2006.01)
(52) U.S. Cl.
CPC .................................. *G01N 27/83* (2013.01)
(58) Field of Classification Search
CPC ..... G01N 27/83; G01N 27/902; G01N 27/904
(Continued)

(56) References Cited

U.S. PATENT DOCUMENTS

| 3,611,120 A | 10/1971 | Forster |
| 3,940,690 A * | 2/1976 | Suhr .................... G01N 27/904 324/242 |

(Continued)

FOREIGN PATENT DOCUMENTS

| CN | 105548346 A | * | 5/2016 |
| JP | S49-23688 A | | 3/1974 |

(Continued)

OTHER PUBLICATIONS

Extended European Search Report dated May 6, 2022, of counterpart European Patent Application No. 20795708.5.

*Primary Examiner* — Christopher P McAndrew
(74) *Attorney, Agent, or Firm* — DLA Piper LLP (US)

(57) ABSTRACT

A leakage-flux flaw detection device includes a plurality of leakage-flux flaw detectors provided at positions not in contact with a steel strip and arranged in a width direction of the steel strip, wherein the leakage-flux flaw detectors each include a rotating disk that faces a surface subjected to flaw detection of the steel strip and that rotates, and a plurality of defect detection heads installed at different positions in a circumferential direction on the rotating disk, that perform direct-current magnetization of the steel strip, and detect leakage flux leaking from a linear defect due to the direct-current magnetization, wherein at least one of the plurality of defect detection heads has an inclination angle different from inclination angles of other defect detection heads, the inclination angle being defined by a tangent line of a rotation trajectory and the magnetization direction at an installation position of the defect detection head.

9 Claims, 9 Drawing Sheets

(58) Field of Classification Search
USPC .......................................................... 324/240
See application file for complete search history.

(56) References Cited

U.S. PATENT DOCUMENTS

| | | | |
|---|---|---|---|
| 4,451,787 A | 5/1984 | Bergstrand et al. | |
| 5,130,652 A | 7/1992 | Kawakami et al. | |
| 5,554,933 A * | 9/1996 | Logue .................... | H02K 24/00 324/241 |
| 5,574,367 A * | 11/1996 | Logue ..................... | G01B 7/30 324/228 |
| 6,265,870 B1 * | 7/2001 | Weischedel .......... | G01N 27/902 324/242 |
| 2010/0007342 A1 * | 1/2010 | Lepage ................ | G01N 27/902 324/240 |
| 2010/0109659 A1 * | 5/2010 | Chang ................ | G01N 27/9006 324/240 |
| 2010/0148767 A1 | 6/2010 | Hyodo et al. | |
| 2012/0092005 A1 | 4/2012 | Hibino et al. | |
| 2012/0161758 A1 | 6/2012 | Hibino et al. | |
| 2014/0191751 A1 * | 7/2014 | Suzuma et al. ........ | G01N 27/83 324/232 |
| 2018/0145575 A1 * | 5/2018 | Woehl-Bruhn ...... | H02K 1/2766 |

FOREIGN PATENT DOCUMENTS

| | | |
|---|---|---|
| JP | S51-115883 A | 10/1976 |
| JP | S52-66485 A | 6/1977 |
| JP | S56-500509 A | 4/1981 |
| JP | H2-147950 A | 6/1990 |
| JP | H9-145679 A | 6/1997 |
| JP | H10-288603 A | 10/1998 |
| KR | 20150061064 A | 6/2015 |
| WO | 2017/111515 A1 | 6/1917 |
| WO | WO-2020218301 A1 * | 10/2020 ............. G01N 27/83 |

* cited by examiner

FIG. 3
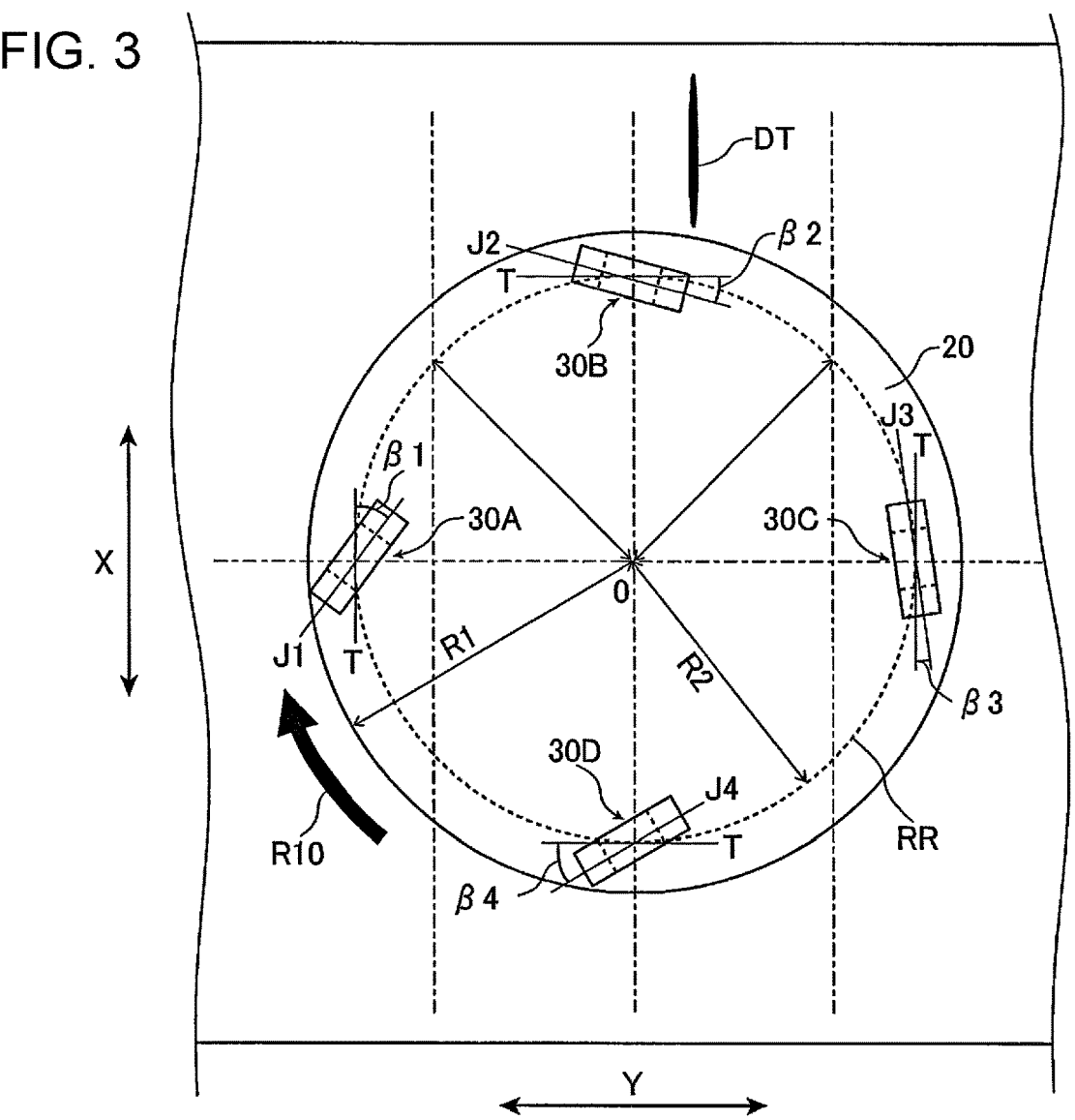
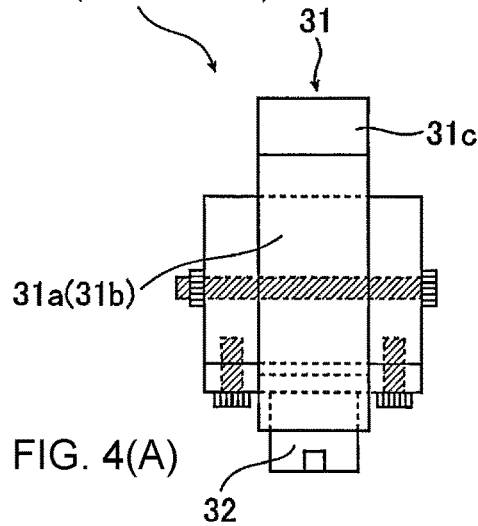
FIG. 4(A)
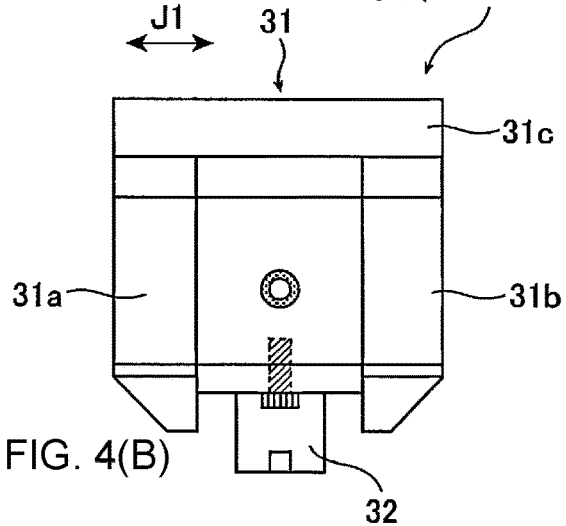
FIG. 4(B)

$\gamma = 90°$ RELATIVE OUTPUT VALUE $\gamma = 75°$ RELATIVE OUTPUT VALUE $\gamma = 65°$ RELATIVE OUTPUT VALUE

LEAKAGE-FLUX FLAW DETECTION DEVICE

TECHNICAL FIELD

This disclosure relates to a leakage-flux flaw detection device that detects a linear defect existing under a surface layer or inside of a steel strip.

BACKGROUND

In recent years, the quality level required for steel products has increased, and surface defects and internal defects having a size that has not been regarded as harmful in the past have become a problem. Among them, the existence or non-existence of surface defects and internal defects is also very important in terms of quality in sheet products such as galvanized steel sheets used for automobile outer panels. Steel sheets for electric appliances and steel sheets for other applications, particularly steel sheets for outer panels, are also increasingly required to have quality levels higher than those of conventional steel sheets.

A galvanized steel sheet for an automobile outer panel is manufactured through a steelmaking step, a hot rolling step, a pickling step, a cold rolling step, and a plating step in a steel process, and is further used through a pressing step and a coating step in an automobile manufacturer. If an automobile outer panel has a surface defect, the portion involving the surface defect looks clearly different from other normal portions, and hence, even if there is no problem in strength, a problem of degraded appearance arises.

In a steel product manufacturing process, an optical surface defect inspection device that detects a surface defect may be used. For example, in a manufacturing process of a steel sheet for an automobile outer panel, when non-metallic inclusions such as alumina-based inclusions and powder-based inclusions caused by steelmaking as being captured by an initially solidified shell are thinly extended by hot rolling or cold rolling, the non-metallic inclusions become serious defects (linear defects) called linear slivers or scabs (heges). Of those sliver defects and scab defects, a defect existing on the surface of a steel sheet after the cold rolling step can be detected by the optical surface defect inspection device. However, if part or most of the defect is made under the surface layer of the steel sheet, the defect is underestimated or cannot be detected, and the defective steel sheet may be delivered to the automobile manufacturer.

In an automobile manufacturer, an internal defect may appear on the surface of a steel sheet after pressing is performed without being aware of the existence of the internal defect that has been made under the surface layer of a delivered sheet product. If the appearing defect is minor, the defect can be removed by simple repair, and hence the removal work does not become a large burden. However, when the appearing defect is a linear defect having a width of about 1 to 2 mm but having a length exceeding 100 mm, much time and effort are required to remove the linear defect, and thus the linear defect is regarded as harmful.

In such a steel strip used as a base material of an automobile outer panel, there are an eddy-current flaw detection method and a leakage-flux flaw detection method as flaw detection methods capable of automatically detecting online a linear defect having a width of about 1 to 2 mm, thinly extended in a rolling direction to have a length of 100 mm or more, and made under the surface layer of a steel strip without a non-detectable zone in the vicinity of the surface layer.

In the eddy-current flaw detection method, an alternating-current (AC) power source having a frequency of several tens of kilohertz or more is usually used for AC excitation. The eddy-current flaw detection method positively utilizes the principle of the skin effect, and the flaw detection range is limited to the vicinity of the outermost surface layer. Thus, the eddy-current flaw detection method is not suitable for the detection of an internal defect made at a deep position under the surface layer of the steel strip. Even in a steel strip having a sheet thickness of 0.9 mm or less, it is required to arrange eddy-current sensor groups in the width direction on both the front and back surfaces for double-sided inspection. Thus, the number of sensor channels may increase, and the cost may increase.

In contrast, in the leakage-flux flaw detection method, if the inspection target material to be inspected is limited to a steel strip having a sheet thickness of 0.9 mm or less, there is a possibility that the flaw detection range can cover one surface and the opposite surface in the sheet thickness direction by disposing a magnetic sensor group to be used only on one surface side. Thus, the leakage-flux flaw detection method has an advantage of being inexpensive because the number of sensor channels is smaller than that of the eddy-current flaw detection method.

Japanese Unexamined Patent Application Publication No. 9-145679 discloses a minute internal defect detection device for a steel strip by a leakage-flux flaw detection method. According to JP '679, even when a defect is a short dot-shaped defect, the device has high detection performance for such a defect as long as the defect is relatively thick. Japanese Unexamined Patent Application Publication No. 2-147950 discloses a leakage-flux flaw detection device configured to cross a linear defect extending in the longitudinal direction by constantly rotating a leakage-flux flaw detection element.

However, in JP '679, since the magnetization direction is parallel to the direction of the linear defect, there is a problem that the leakage flux from the linear defect is small and the S/N ratio is poor. In JP '950, since means for magnetizing with an alternating current is used, there is a problem of the skin effect as in the eddy-current flaw detection method, and the device is not suitable for an internal defect made at a deep position under the surface layer. Further, the exciting current supplied to an exciting coil is not an alternating current but a direct current (DC), and the device is applied as an internal defect detection device for a steel strip. However, in the configuration disclosed in JP '950, an electromagnet having such a wide magnetic pole interval as to sandwich a rotating mechanism for a leakage-flux detection element is used. In general, in the leakage-flux flaw detection by DC excitation, it is required to magnetize a material to be detected to an extent close to a magnetic saturation range to reduce material noise of the material to be detected. With the configuration disclosed in JP '950, the magnetic force corresponding to the magnetization cannot be generated between the magnetic poles at all, and the S/N ratio required for flaw detection cannot be provided.

It could therefore be helpful to provide a leakage-flux flaw detection device capable of improving an S/N ratio and hence accurately detecting a linear defect existing under a surface layer or inside of a steel strip, and a leakage-flux flaw detection device capable of detecting a linear defect without omission over the entire area in the width direction of the steel strip is provided.

SUMMARY

I thus provide:

[1] A leakage-flux flaw detection device that detects a linear defect of a steel strip includes a plurality of leakage-flux flaw detection units provided at positions not in contact with the steel strip and arranged in a width direction of the steel strip, in which the leakage-flux flaw detection units each include a rotating disk that faces a surface subjected to flaw detection of the steel strip and that rotates, and a plurality of defect detection heads that are installed at different positions in a circumferential direction on the rotating disk, that perform direct-current magnetization of the steel strip, and that detect leakage flux leaking from a linear defect due to the direct-current magnetization, and in which at least one of the plurality of defect detection heads has an inclination angle different from inclination angles of the other defect detection heads, the inclination angle being defined by a tangent line of a rotation trajectory and the magnetization direction at an installation position of the defect detection head.

[2] In the leakage-flux flaw detection device according to [1], the plurality of defect detection heads detect the linear defect in different regions in the circumferential direction corresponding to the difference in the inclination angles as flaw detectable ranges, and the leakage-flux flaw detection units have effective flaw detection ranges in the width direction of the steel strip corresponding to the flaw detectable ranges of all the defect detection heads.

[3] In the leakage-flux flaw detection device according to [2], the inclination angles of the plurality of defect detection heads are set to form an overlapping flaw detection range in which adjacent ones of the flaw detectable ranges in the circumferential direction overlap each other.

[4] In the leakage-flux flaw detection device according to [2] or [3], the plurality of leakage-flux flaw detection units are arranged to form an effective overlapping range in which adjacent ones of the effective flaw detection ranges overlap each other.

[5] In the leakage-flux flaw detection device according to any one of [1] to [4], the defect detection heads each include a magnetizer including two permanent magnets and a yoke that couples an S pole of one of the permanent magnets and an N pole of the other one of the permanent magnets to each other, and that direct-current-magnetizes the steel strip in a magnetization direction of the yoke, and a magnetic sensor provided between the two permanent magnets and configured to detect leakage flux leaking from the linear defect.

[6] In the leakage-flux flaw detection device according to any one of [1] to [5], the plurality of leakage-flux flaw detection units detect the linear defect while the steel strip travels, and are installed to face a portion of the traveling steel strip wound around a non-magnetic roll.

[7] In the leakage-flux flaw detection device according to any one of [1] to [5], the plurality of leakage-flux flaw detection units detect the linear defect while the steel strip travels, and are disposed in a region between two pressing rolls that press the traveling steel strip.

[8] In the leakage-flux flaw detection device according to any one of [1] to [7], the plurality of leakage-flux flaw detection units are arranged in a staggered manner.

[9] The leakage-flux flaw detection device according to any one of [1] to [8], further includes a detection control unit that detects existence or non-existence of a linear defect of the steel strip based on detection signals detected by the plurality of leakage-flux flaw detection units.

According to my leakage-flux flaw detection device, by rotating the plurality of defect detection heads set so that the inclination angle of the at least one defect detection head differs from the inclination angles of the other defect detection heads with respect to the steel strip, the flaw detectable range of each defect detection head is set for each of the regions different in the circumferential direction to detect the linear defect. Thus, the leakage-flux flaw detection device can accurately detect leakage flux from a linear defect extended in a rolling direction.

BRIEF DESCRIPTION OF THE DRAWINGS

FIG. 3 is a schematic view illustrating an example of the leakage-flux flaw detection unit in FIG. 1.

FIGS. 4(A) and (B) provide schematic views illustrating an example of a defect detection head.

Figure 1:
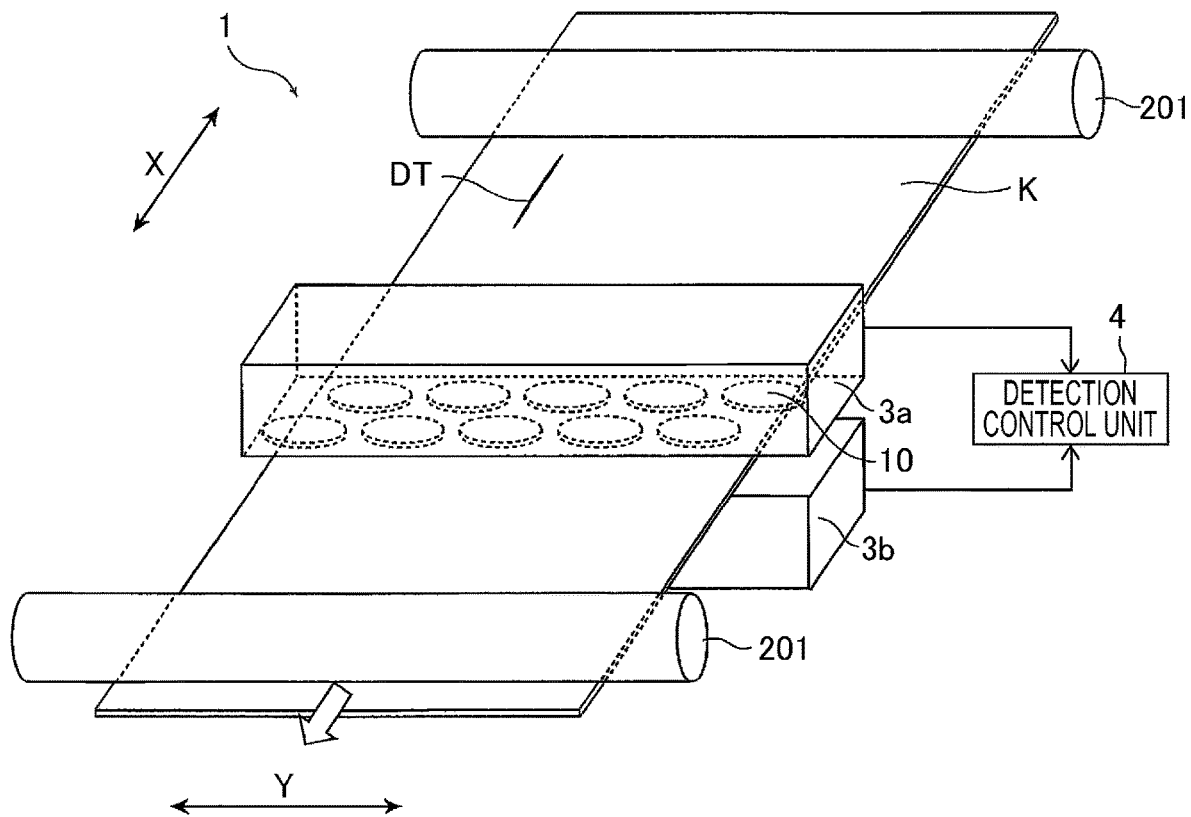
FIG. 1 is a schematic view illustrating a leakage-flux flaw detection device according to a first example.

REFERENCE SIGNS LIST 1, 300 leakage-flux flaw detection device
2a, 2b non-magnetic roll
3a, 3b, 301a, 301b storage box
4 detection control unit
10 leakage-flux flaw detection unit
20 rotating disk
21 rotating shaft
22 motor
23 timing belt
30A to 30D, 130 defect detection head
31 magnetizer
31a, 31b permanent magnet 31c yoke
32 magnetic sensor
201 pressing roll
DR overlapping flaw detection range
DT linear defect (sliver defect)
EDR effective overlapping range
FR, θFR effective flaw detection range
FR0 to FR4 flaw detectable range
J, J1 to J4 magnetization direction
K steel strip
L lift-off amount
RR rotation trajectory
T tangent line
β inclination angle
β1 to β4 inclination angle
γ flaw detection angle
θ rotation angle

DETAILED DESCRIPTION

First Example

Examples of my devices will be described below. FIG. 1 is a schematic view illustrating a leakage-flux flaw detection device according to a first example. A leakage-flux flaw detection device 1 illustrated in FIG. 1 detects a linear defect DT online while a steel strip K travels in the longitudinal direction (arrow X direction). The leakage-flux flaw detection device 1 detects leakage flux leaking from the linear defect DT when a portion to be inspected of the steel strip K is DC-magnetized to detect the linear defect. The width direction of the steel strip is defined as the Y direction. The sheet thickness direction of the steel strip is defined as the Z direction.

The leakage-flux flaw detection device 1 includes storage boxes 3a and 3b disposed to face the traveling steel strip K. In each of the storage boxes 3a and 3b, a plurality of leakage-flux flaw detection units 10 that DC-magnetize the steel strip K and detect leakage flux generated by the linear defect DT are arranged in the sheet width direction and disposed in a plurality of rows in an advance direction of the steel strip K. The storage box 3a is installed on the front surface side of the steel strip K, and leakage flux is detected from the front surface side of the steel strip K. The storage box 3b is installed on the back surface side of the steel strip K, and leakage flux is detected from the back surface side of the steel strip K.

The leakage-flux flaw detection device 1 includes a detection control unit 4 that controls the operations of the plurality of leakage-flux flaw detection units 10 in the storage boxes 3a and 3b and that determines the existence or non-existence of a linear defect based on the leakage flux detected by each of the leakage-flux flaw detection units 10.

FIG. 1 exemplarily illustrates when the storage boxes 3a and 3b are disposed at both surfaces of the steel strip K. However, when the sheet thickness of the steel strip K is 0.9 mm or less, as long as the storage box is disposed at only one of the front surface and the back surface, flaw detection can be performed over the entire range in the sheet thickness direction. The storage boxes 3a and 3b do not have to be located at the same position, and may be located at different positions.

The plurality of leakage-flux flaw detection units 10 are disposed on the surface of each of the storage boxes 3a and 3b facing the steel strip K. The plurality of leakage-flux flaw detection units 10 are installed to face the traveling steel strip K.

The plurality of leakage-flux flaw detection units 10 are arranged in a so-called staggered manner by the leakage-flux flaw detection units 10 in the storage box 3a and the leakage-flux flaw detection units 10 in the storage box 3b. That is, a plurality of (for example, five) leakage-flux flaw detection units 10 are linearly arranged in one row in the width direction (arrow Y direction) of the steel strip K in each of the storage boxes 3a and 3b, and are disposed in the traveling direction (arrow X direction) so that the positions disposed in the width direction are shifted from each other (see FIG. 10 described later). The number of the leakage-flux flaw detection units 10 along the width may be properly determined in accordance with the width of the steel strip K.

Figure 2:
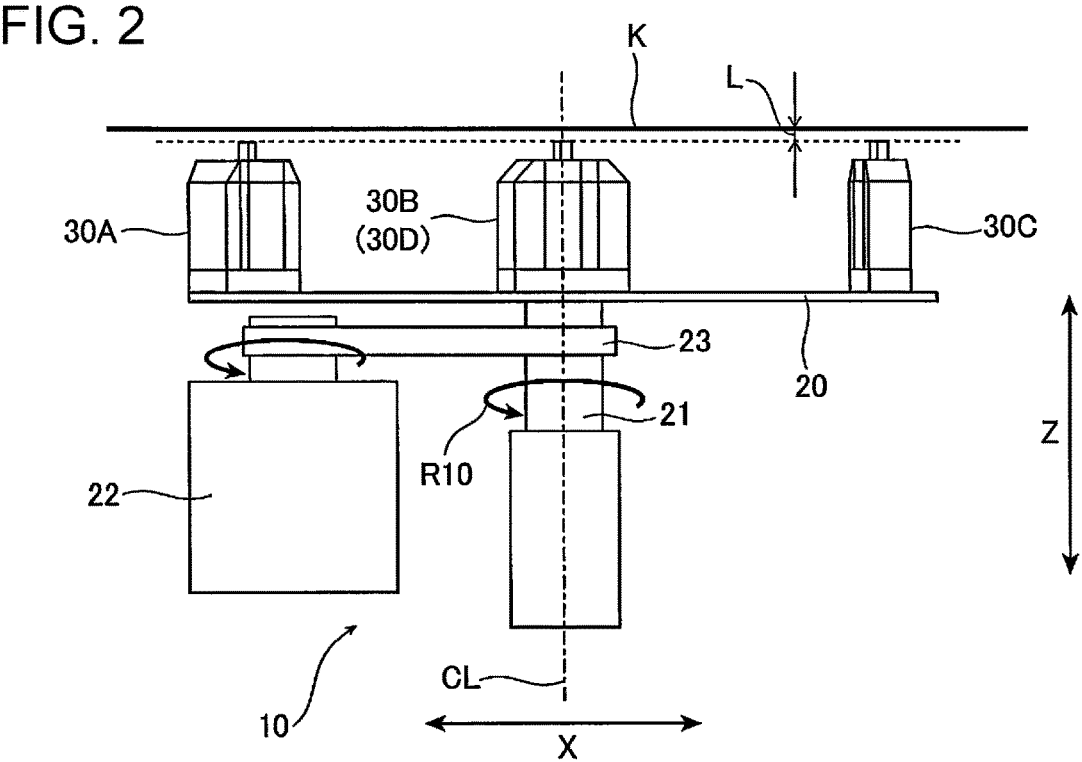
FIG. 2 is a schematic view illustrating an example of a leakage-flux flaw detection unit in FIG. 1.

FIG. 2 is a schematic view illustrating an example of the leakage-flux flaw detection unit 10 in FIG. 1. The leakage-flux flaw detection unit 10 illustrated in FIG. 2 is provided at a position not in contact with the steel strip K, and includes a rotating disk 20 that is rotatably supported and a plurality of defect detection heads 30A to 30D installed at different positions in the circumferential direction of the rotating disk 20. As illustrated in FIG. 2, the leakage-flux flaw detection unit 10 is installed at a position separated from the steel strip K by a predetermined lift-off amount L. To reliably and stably detect the leakage flux from the linear defect DT, it is important that the steel strip K and the rotating disk 20 are parallel to each other and that the lift-off amount L does not vary. Hence, the rotating disk 20 is installed parallel to the steel strip K so that the lift-off amount L is constant with respect to the steel strip K.

The lift-off amount L may be properly set depending on the type of the steel strip K, the size and flux density of permanent magnets to be described later and the like. For example, the lift-off amount L may be 1 mm. The preferred range is about 0.5 to 3 mm. If the lift-off amount is too small, the leakage-flux flaw detection unit 10 may be damaged by the vertical movement of the steel strip K. In contrast, if the lift-off amount is too large, it becomes difficult to detect the leakage flux, and hence the defect detection accuracy deteriorates.

To reduce the variation of the lift-off amount L as illustrated in FIG. 1, pressing rolls 201 may be installed at the front and rear of the storage boxes to suppress the vertical movement of the steel strip K. The pressing rolls 201 are located on the upper side of the steel strip in FIG. 1. However, the pressing rolls 201 may be provided on the lower side of the steel strip, or upper and lower press rolls may sandwich the steel strip K. Moreover, in FIG. 1, the flaw detection is performed at a portion where the steel strip K moves in the horizontal direction; however, the flaw detection may be performed at a portion where the steel strip K moves in the vertical direction, or may be performed at a roll portion.

As illustrated in FIG. 2, the rotating disk 20 faces a flaw detection surface of the steel strip K, and has, for example, a size of a radius R1=175 mm. The rotating disk 20 is fixed to a rotating shaft 21 at the center CL, and the rotating shaft 21 is rotatably supported in an arrow R10 direction. The rotating shaft 21 is connected to a motor 22 via a timing belt 23. When the timing belt 23 is rotated in the arrow R10 direction by the motor 22, the rotating disk 20 is rotated in the arrow R10 direction together with the rotating shaft 21. The operation of the motor 22 and the rotation speed of the rotating disk 20 are controlled by the detection control unit 4, and the rotating disk 20 rotates at, for example, a constant speed. Note that the rotating disk 20 may be connected to the motor 22 directly or via a transmission or the like.

As illustrated in FIG. 3, the plurality of defect detection heads 30A to 30D are installed at different positions in the circumferential direction of the rotating disk 20 on a rotation trajectory RR having a rotation radius R2 (for example, R2=150 mm) of the rotating disk 20. FIG. 3 illustrates an example in which the four defect detection heads 30A to 30D are disposed to be shifted in the circumferential direction by 90° at equal intervals. As illustrated in FIG. 2, each of the defect detection heads 30A to 30D is separated from the steel strip K by the predetermined lift-off amount L, and faces the steel strip K in a non-contact manner.

FIGS. 4(A) and (B) are schematic views illustrating an example of the defect detection heads 30A to 30D, and the configuration of the defect detection heads 30A to 30D will be described with reference to these drawings. Since the defect detection heads 30A to 30D have the same configuration, the configuration of the defect detection head 30A will be described with reference to FIGS. 4(A) and (B). The defect detection head 30A DC-magnetizes the steel strip K and detects leakage flux leaking from the linear defect DT due to the DC magnetization. Specifically, the defect detection head 30A has a magnetizer 31 that DC-magnetizes the steel strip K and a magnetic sensor 32 that detects leakage flux leaking from the linear defect DT when magnetized by the magnetizer 31.

The magnetizer 31 includes permanent magnets 31a and 31b and a yoke 31c made of mild steel that is magnetized by the permanent magnets 31a and 31b. The permanent magnets 31a and 31b are made of, for example, neodymium magnets, and disposed at both ends of the yoke 31c to be separated from each other by a predetermined magnetic pole interval. The direction in which the yoke 31c extends is the magnetization direction in which the steel strip K is DC-magnetized. As will be described later, the magnetic sensor 32 detects the linear defect DT in which a flaw detection angle formed by the magnetization direction of the magnetic sensor 32 and the linear defect DT is within a flaw detectable range of the magnetic sensor 32. For example, when the permanent magnets 31a and 31b are made of neodymium magnets and the magnetic pole interval of the yoke 31c is about 30 mm, it is possible to obtain sufficient magnetic force required for flaw detection of leakage flux of the steel strip K having a sheet thickness of 0.9 mm or less.

As illustrated in FIG. 3, the defect detection heads 30A to 30D are disposed to have inclination angles β1 to β4 different from each other, the inclination angles β1 to β4 being defined between tangent lines T of the rotation trajectory RR and magnetization directions J1 to J4 at the installation positions. For example, the inclination angles β1 to β4 of the defect detection heads 30A to 30D are disposed to be β1=30°, β2=10°, β3=−10° and β4=−30° when the clockwise direction is defined as positive at a reference position of any one point on the rotation trajectory RR. Then, the plurality of defect detection heads 30A to 30D detect a linear defect in different regions in the circumferential direction corresponding to the difference in the inclination angles β1 to β4 as flaw detectable ranges. The flaw detectable ranges and the relationship between the inclination angles β1 to β4 and the flaw detectable ranges will be described below. The reference position of any one point on the rotation trajectory RR is, for example, one of two points at which a line passing through the center of the rotating disk 20 and perpendicular to the longitudinal direction (Z direction in FIG. 3) of the steel strip K intersects the rotation trajectory RR. The clockwise direction is defined as being positive on the reference position of any one point when the magnetization direction of the defect detection head 30 moves in the clockwise direction from the direction of the tangent line on the reference position of any one point.

Figure 5:
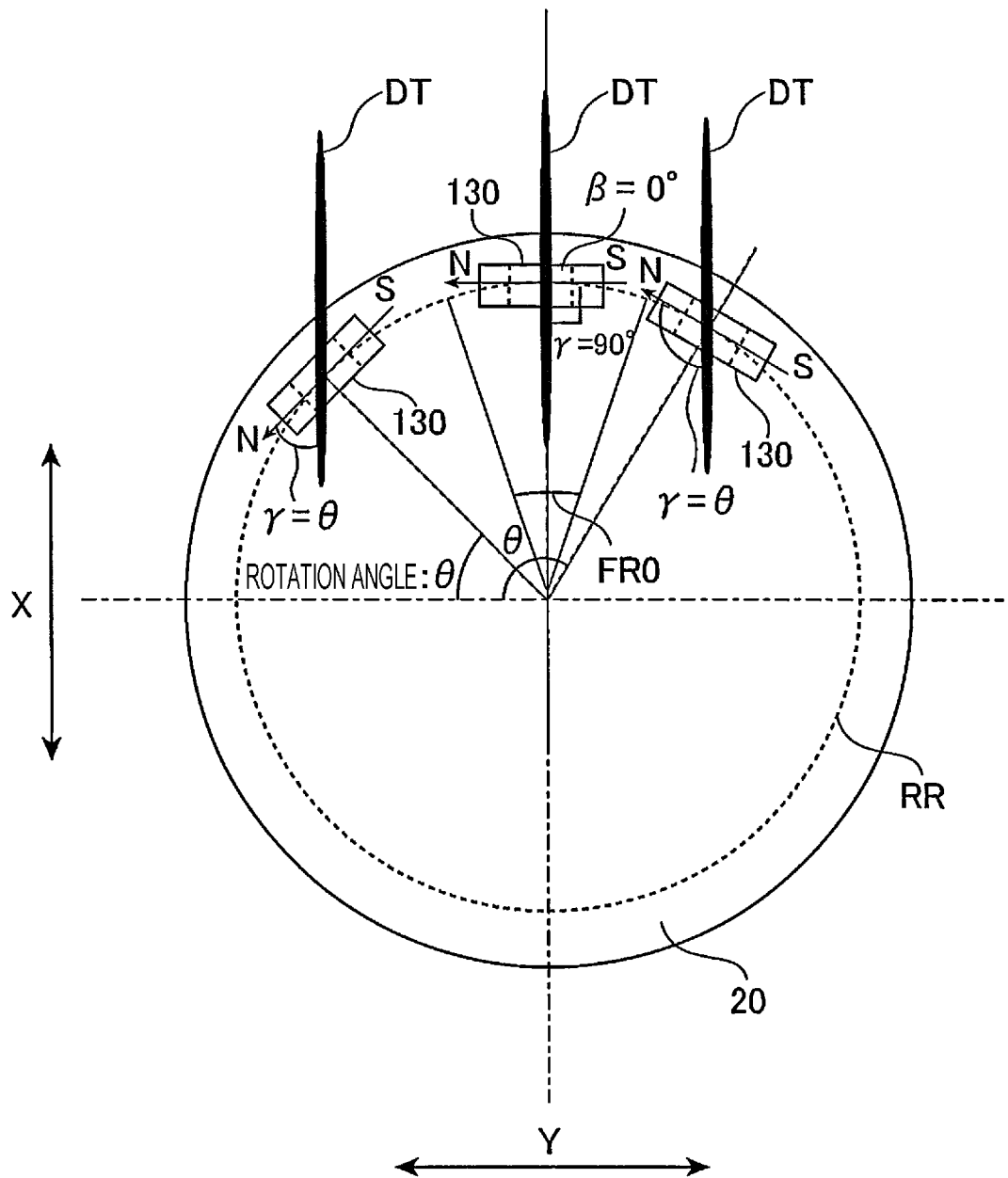
FIG. 5 is a schematic view illustrating the positional relationship between a defect detection head and a linear defect.

FIG. 5 is a schematic view illustrating the positional relationship between a defect detection head and a linear defect. A defect detection head 130 illustrated in FIG. 5 has the same configuration as that of the defect detection head 30A illustrated in FIGS. 4(A) and (B). However, one defect detection head 130 is installed on the rotating disk 20 so that the magnetization direction J (the line connecting the N pole and the S pole of the magnet) becomes equal to the tangent line T (inclination angle β=0°), and FIG. 5 illustrates a state at each rotational position of the defect detection head 130. In this example, a flaw detection angle γ defined by the formation direction (arrow X direction) of the linear defect DT and the magnetization direction corresponds to the rotation angle θ (γ=θ), and becomes, for example, the flaw detection angle γ=90° in the rotation angle θ=90°. The rotation angle θ is based on a line passing through the center of the rotating disk 20 and perpendicular to the longitudinal direction (X direction in FIG. 5) of the steel strip K.

Figure 6A:
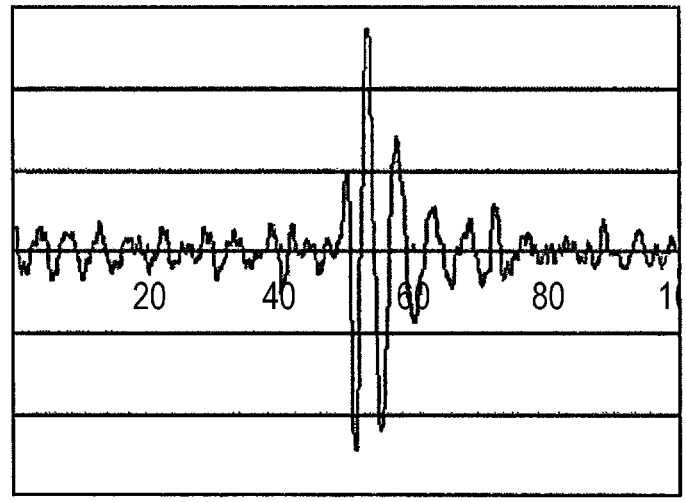
FIGS. 6(A)-(C) provides graph presenting an example of relative output values when a linear defect is detected at different flaw detection angles.
Figure 6B:
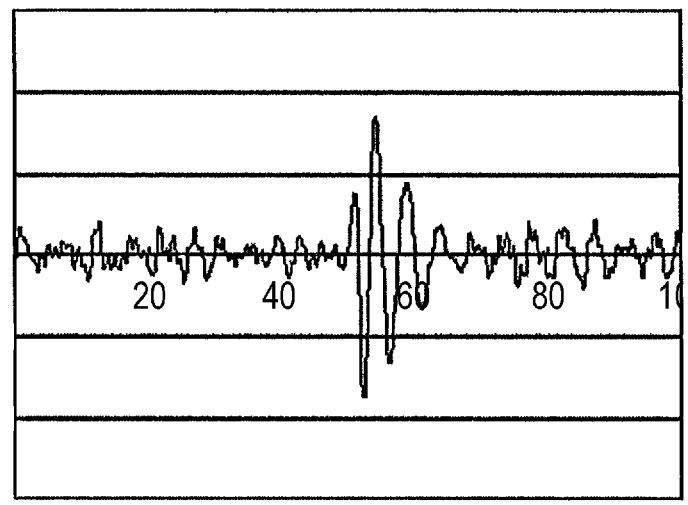
Figure 6C:
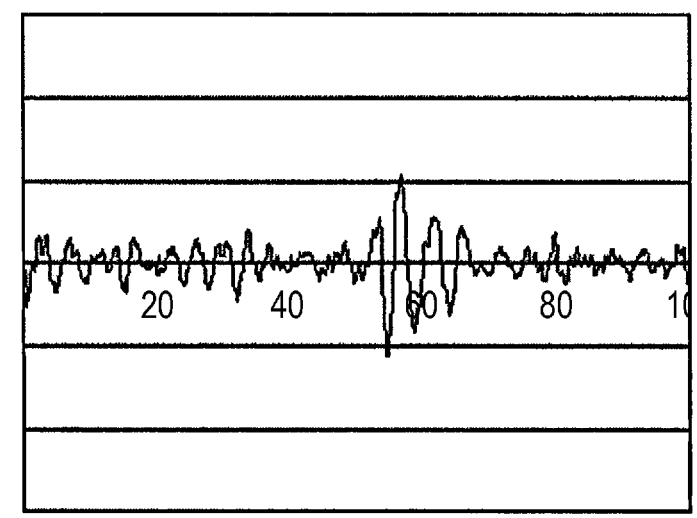
Figure 7:
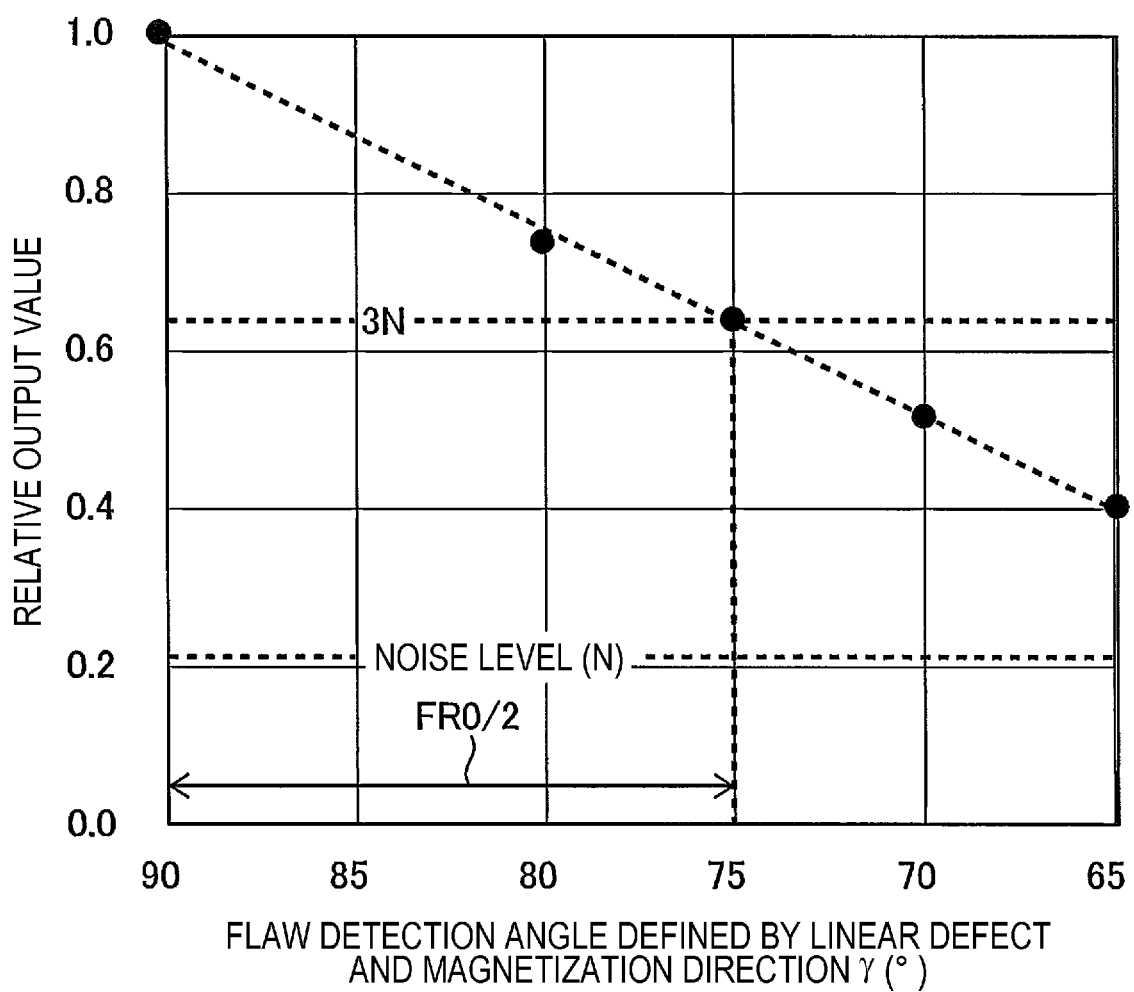
FIG. 7 is a graph presenting the relationship between a flaw detection angle and a relative output value.

FIGS. 6(A)-(C) provide graphs presenting an example of relative output values relatively indicating values of leakage flux detected when the defect detection head 130 illustrated in FIG. 5 passes through a linear defect at different flaw detection angles. FIG. 7 is a graph presenting the relationship between a flaw detection angle and a relative output value. FIG. 6(A) indicates the relative output value in the flaw detection angle γ=90°, FIG. 6(B) indicates the relative output value in the flaw detection angle γ=75°, and FIG. 6(C) indicates the relative output value in the flaw detection angle γ=65°.

First, a linear defect (sliver defect) DT is formed in advance at a position in the width direction (arrow Y direction) corresponding to the rotation angles θ=90°, 80°, 75°, and 65° in the steel strip K for test. The rotating disk 20 is rotated, and the magnetic sensor 32 of the defect detection head 130 detects leakage flux from the steel strip K. When the defect detection head 130 crosses the linear defect DT, large leakage flux is detected. In contrast, the level of the leakage flux from a portion of the steel strip K without the linear defect DT is a noise level. Since the defect detection head 130 crosses the linear defect DT at different angles through the rotation of the rotating disk 20, leakage flux having a magnitude corresponding to the rotation angle is detected. Hence, the leakage flux is detected for each rotation angle θ; and is obtained as a relative output value.

FIGS. 6 and 7 present graphs in the range of the flaw detection angles γ=65° to 90°. The relative output value when the flaw detection angle γ is larger than 90°, that is, when the rotation angle θ is in the range of 90°<θ≤180° is the same as the relative output value when the flaw detection angle γ=180°−θ. Then, the detection control unit 4 in FIG. 1 acquires output values as indicated in FIGS. 6(A)-(C) detected by the defect detection heads 30A to 30D, and outputs a determination result that a defect exists when the acquired output values exceed a preset threshold value. The determination reference for a defect may be properly set such that a defect exists when the maximum value of the acquired output values exceeds the threshold value, a defect exists when the acquired output values exceed the threshold value a plurality of times, or the like.

FIG. 7 illustrates an example of the ratio of the maximum value of the relative output value at each flaw detection angle to the maximum value of the relative output value when γ is 90°. As illustrated in FIGS. 6 and 7, as the flaw detection angle γ decreases from 90°, the relative output value when the linear defect is detected decreases. That is, as the flaw detection angle γ defined by the magnetization direction J and the linear defect approaches 90°, the relative output value increases. In this example, by properly setting the ratio between the noise level and the detected relative output value, that is, the S/N ratio, it is possible to accurately detect the linear defect. For example, if defect detection accuracy is sufficiently high when the S/N ratio is 3 or more, it is sufficient that the relative output value=0.63 or more with respect to the noise level N=0.21 in the example of FIG. 7. When the S/N ratio is set to 3 or more, in FIG. 5, a flaw detectable range FR0 of the defect detection head 130 has a range (75°≤θ≤105°) that is ±15° of the rotation angle θ=90°. The flaw detectable range is not limited to this range, and differs depending on the magnetic force of the permanent magnets 31$a$ and 31$b$, the magnetic pole interval of the yoke 31$c$, and the like. The S/N ratio may also be properly set so that the linear defect DT can be reliably detected.

As described above, FIG. 5 illustrates when the defect detection head 130 is installed on the rotating disk 20 so that the magnetization direction J is aligned with the tangent direction T. In contrast, when the magnetization direction J is inclined by the inclination angle β with respect to the tangent direction T, the flaw detectable range FR0 is also rotated by the inclination angle β (75°−β≤θ≤105°−β). That is, as illustrated in FIG. 3, as long as the inclination angles β1 to β4 of the defect detection heads 30A to 30D differ from each other, the flaw detectable ranges FR1 to FR4 of the defect detection heads 30A to 30D are set to different regions in the circumferential direction.

Figure 8:
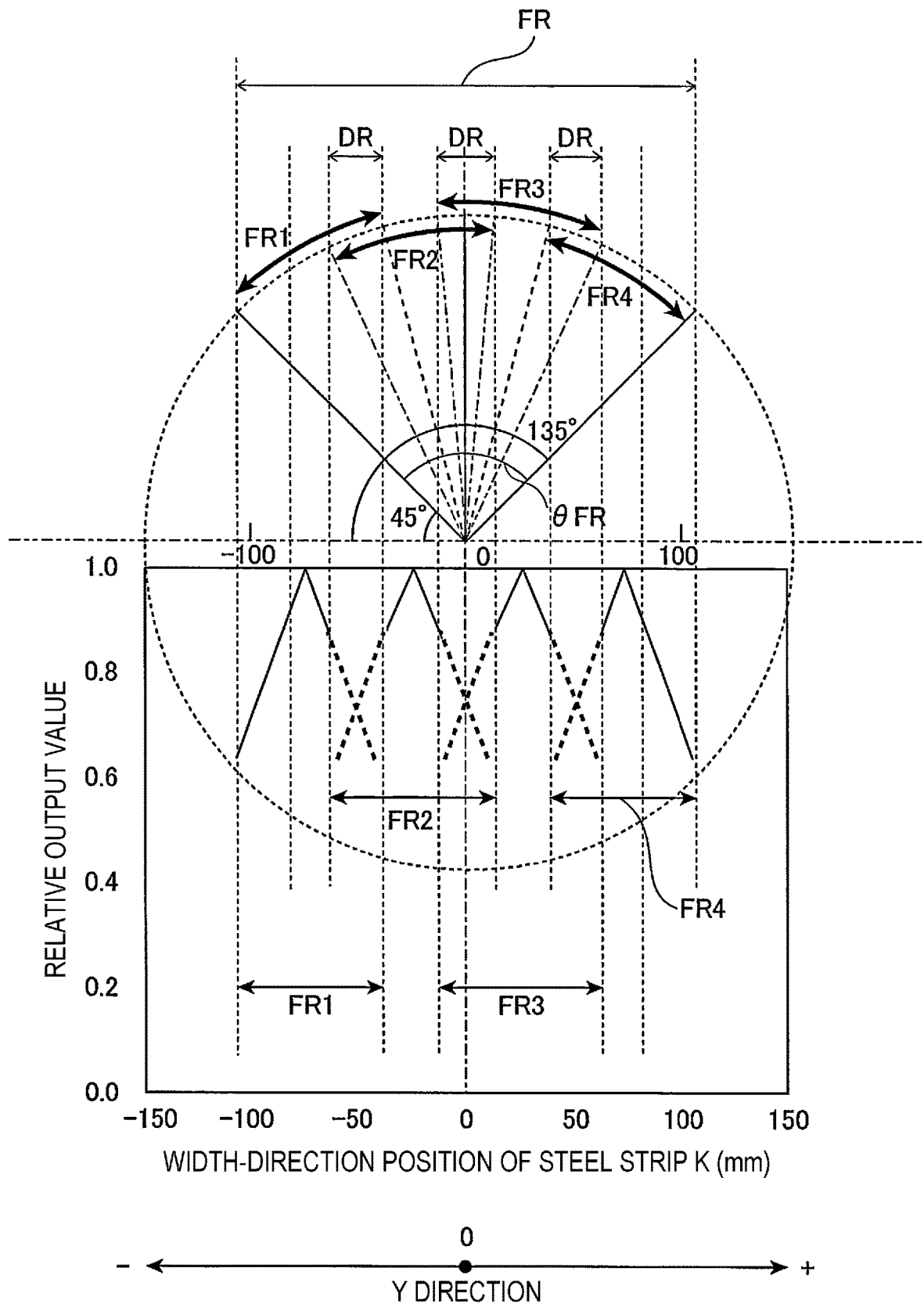
FIG. 8 is a schematic view illustrating the relationship between a flaw detectable range of each of the plurality of defect detection heads illustrated in FIG. 3 and a flaw detection region in the width direction of a steel strip.

FIG. 8 is a schematic view illustrating the relationship between the flaw detectable range for each of the plurality of defect detection heads illustrated in FIG. 3 and the flaw detection region in the width direction of the steel strip. The flaw detectable ranges FR1 to FR4 in FIG. 8 correspond to the defect detection heads 30A to 30D in FIG. 3. It is assumed that each of the defect detection heads 30A to 30D has the same performance as that of the defect detection head 130 illustrated in FIGS. 5 to 7. Similarly to FIG. 3, the inclination angles β1 to β4 are set to β1=30°, β2=10°, β3=−10° and β4=−30°, respectively.

More specifically, the flaw detectable range FR1 of the defect detection head 30A is formed in a range of 45°≤θ≤75° in the circumferential direction by substituting β=β1. That is, for example, the flaw detectable range FR1 having an S/N ratio of 3 or more is formed at a position rotated by 30° with respect to FR0. Likewise, the flaw detectable range FR2 of the detection head 30B is formed in a range of 65°≤θ≤95° in the circumferential direction by substituting β=β2. The flaw detectable range FR3 of the defect detection head 30C is formed in a range of 85°≤θ≤115° in the circumferential direction by substituting β=β3. The flaw detectable range FR4 of the defect detection head 30D is formed in a range of 105°≤θ≤135° in the circumferential direction by substituting β=β4.

In this manner, each of the defect detection heads 30A to 30D detects a linear defect DT in the flaw detectable ranges FR1 to FR4 at the different positions in the circumferential direction. In this example, the relative output value of the defect detection head 30A becomes maximum when θ=60° (at the center of 45°≤θ≤75°). This is because the magnetization direction J of the defect detection head 30A is aligned with the tangent direction T at the time of θ=60°. In contrast, the relative output value becomes minimum when θ=45° and θ=75°. That is, the relative output value becomes maximum at the center of FR1 and becomes minimum at both ends of FR1. The same applies to the defect detection heads 30B to 30D. FIG. 8 presents the relationship between the respective flaw detection angles, the positions of the steel strip K, and the relative output values in FR1 to FR4. The relative output values in FIG. 8 are schematically presented with the relative output value at the center angle of each of FR1 to FR4 being 1 and the value at the flaw detection angle at which the S/N ratio is 3 being minimum.

The inclination angles β1 to β4 are set to form overlapping flaw detection ranges DR in which portions of adjacent ones of the flaw detectable ranges FR1 to FR4 adjacent in the circumferential direction overlap each other. For example, the flaw detectable range FR1 of the defect detection head 30A is 45°≤θ≤75°, whereas the flaw detectable range FR2 of the defect detection head 30B is 65°≤θ≤95°. The flaw detectable ranges FR1 and FR2 overlap each other in the range of 65° to 75° to form an overlapping flaw detection range DR. Likewise, an overlapping flaw detection range DR is set between the flaw detectable ranges FR2 and FR3, and between the flaw detectable ranges FR3 and FR4. Since the adjacent ones of the flaw detectable ranges FR1 to FR4 overlap each other, a linear defect DT in the rotation trajectory of the rotating disk 20 can be detected without omission. The detection control unit 4 in FIG. 1 uses an output value having a high signal level (a relative output value indicated by a thick broken line in the overlapping flaw detection range DR in FIG. 8) in the overlapping flaw detection range DR to determine the existence or non-existence of a linear defect.

The effective flaw detection range FR of the entirety of one leakage-flux flaw detection unit 10 is a region in which all of the flaw detectable ranges FR1 to FR4 in the circumferential direction formed by the plurality of defect detection heads 30A to 30D overlap each other. In FIG. 8, an effective flaw detection range FR (θFR) of one leakage-flux flaw detection unit 10 is 45°≤θ≤135°. When converted into the width direction (arrow Y direction) of the steel strip K, the effective flaw detection range FR in the width direction (arrow Y direction) of the steel strip K becomes FR=2×(R2× cos 45°)=R2×2$^{1/2}$=212 mm (the range of ±106 mm at the position in the width direction of the steel strip K with the center of the rotating disk 20 being the origin) in the rotation trajectory radius R2=150 mm for each of the detection heads 30A to 30D. Since β1 to β4 have the inclination angles in this manner, it is possible to widen the flaw detection range for a defect of one leakage-flux flaw detection unit 10. In this way, the flaw detection region in the width direction of the steel strip K of one leakage-flux flaw detection unit 10 in the ranges corresponding to the flaw detectable ranges FR1 to FR4 is set.

Figure 9:
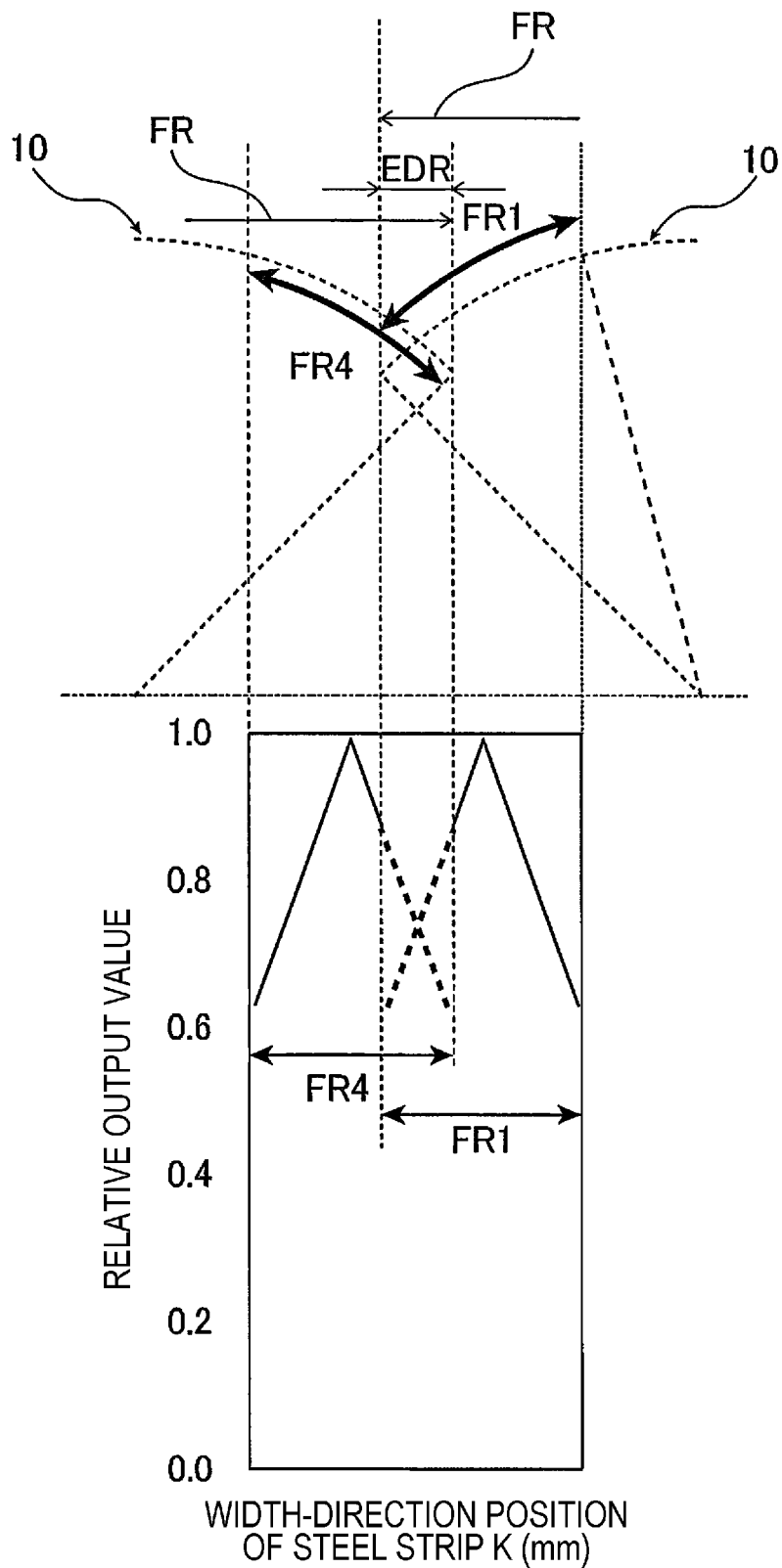
FIG. 9 is a schematic view illustrating an effective flaw detection range between adjacent leakage-flux flaw detection units.

As described above, the effective flaw detection range FR is smaller than the diameter of the rotating disk 20. If a plurality of leakage-flux flaw detection units 10 are simply disposed in the width direction of the steel strip K, there is a possibility that a linear defect DT passes through a gap between the effective flaw detection ranges FR. Hence, as illustrated in FIG. 9, a plurality of leakage-flux flaw detection units 10 are disposed so that the effective flaw detection ranges FR of the adjacent leakage-flux flaw detection units 10 overlap each other. A portion where the effective flaw detection ranges FR overlap each other is referred to as an effective overlapping range EDR. By properly setting the effective overlapping range EDR, it is possible to reduce the possibility that a linear defect DT passes through a gap between the leakage-flux flaw detection units 10. Also, in the effective overlapping range EDR, an output value having a high signal level (a relative output value indicated by a thick broken line in the overlapping flaw detection range DR in FIG. 9) is used to determine the existence or non-existence of a linear defect.

When the effective overlapping range EDR is provided, the plurality of leakage-flux flaw detection units 10 cannot be disposed in one row in a direction orthogonal to the advance direction of the steel strip K. Hence, when the effective overlapping range EDR is provided, the plurality of leakage-flux flaw detection units 10 are disposed in a plurality of rows in the direction orthogonal to the advance direction of the steel strip K.

Figure 10:
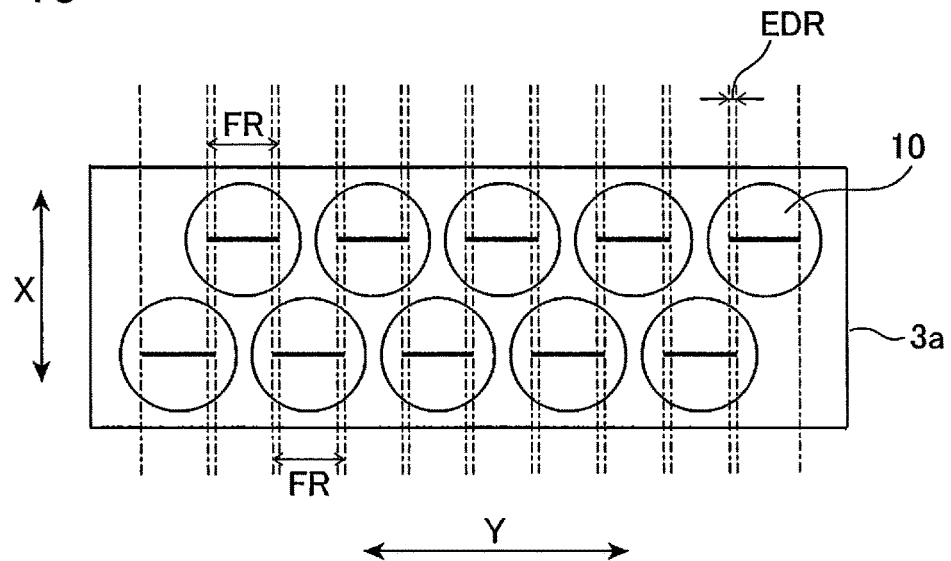
FIG. 10 is a schematic view of an example in which a plurality of leakage-flux flaw detection units 10 are disposed in a plurality of rows.

FIG. 10 is a schematic view of an example in which a plurality of leakage-flux flaw detection units 10 are disposed in a plurality of rows. In FIG. 10, in this example, the leakage-flux flaw detection units 10 are disposed so that the centers of the leakage-flux flaw detection units 10 are shifted from each other by a predetermined amount in the width direction of the steel strip K. When the leakage-flux flaw detection units 10 are disposed in one row, the effective overlapping range EDR cannot be provided. However, when the leakage-flux flaw detection units 10 are disposed in a plurality of rows so that the centers of the leakage-flux flaw detection units 10 are shifted from each other, the effective overlapping range EDR can be provided as a whole. By disposing and arranging the leakage-flux flaw detection units 10 in this manner, it is possible to further reduce detection omission of a linear defect DT and detect a linear defect DT in the entire width direction (Y direction in FIG. 10) of the steel strip K.

In the leakage-flux flaw detection units 10 in which the rotating disk 20 has a radius R1=175 mm, the defect detection heads 30A to 30D have a rotation trajectory radius R2=150 mm, and the defect detection heads 30A to 30D respectively have detection angles of $\beta 1=30°$, $\beta 2=10°$, $\beta 3=-10°$, and $\beta 4=-30°$, the effective flaw detection range FR is $R2 \times 2^{1/2}=212$ mm. When the leakage-flux flaw detection units 10 in the storage box 3a are installed so that the effective overlapping range EDR becomes 24 mm in the width direction of the steel strip K, inspection can be performed up to the width of 1904 mm at maximum. The leakage-flux flaw detection units 10 may be disposed so that the end portions in the width direction of the steel strip are accommodated in FR of the outermost leakage-flux flaw detection units 10.

In summary, according to the first example, by rotating the plurality of defect detection heads 30A to 30D having the different inclination angles $\beta 1$ to $\beta 4$ with respect to the steel strip K, the flaw detectable ranges FR1 to FR4 of the respective defect detection heads 30A to 30D are set for the respective regions different in the circumferential direction to detect a linear defect DT. Thus, leakage flux from the linear defect DT can be accurately detected.

In particular, it is possible to accurately detect a linear defect that exists under the surface layer or the inside of the steel strip, has a width of 1 to 2 mm, gradually increases in thickness from the leading end portion in the rolling direction (even in a thick portion in the middle, the thickness is about 20 to 30 μm), and then gradually decreases in thickness toward the tail end portion.

The shortest length of a detectable linear defect DT is, for example, 67 mm (=(60/3000)×(200/60)×1000) when the rotation speed of the rotating disk 20 by the motor 22 is 3000 rpm and the traveling speed of the steel strip K is 200 mpm.

When the plurality of defect detection heads 30A to 30D have the overlapping flaw detection ranges DR in which the flaw detectable ranges FR1 to FR4 overlap each other, a linear defect DT can be detected in the effective flaw detection ranges FR of the leakage-flux flaw detection units 10 without a gap. Further, when the plurality of leakage-flux flaw detection units 10 have the effective overlapping ranges EDR in which the effective flaw detection ranges FR of the leakage-flux flaw detection units 10 overlap each other, the leakage-flux flaw detection device 1 as a whole can detect a linear defect DT without a gap in the width direction (arrow Y direction) of the steel strip K.

Moreover, as illustrated in FIG. 1, when the plurality of leakage-flux flaw detection units 10 are disposed in the region between the two pressing rolls 201 that press the traveling steel strip K, it is possible to suppress the influence of a variation in distance due to fluttering of the steel strip K.

Furthermore, as illustrated in FIG. 10, when the plurality of leakage-flux flaw detection units 10 are arranged in a staggered manner, it is possible to set a flaw detection range without a gap in the width direction (arrow Y direction) of the steel strip K as the entire device.

Second Example

Figure 11:
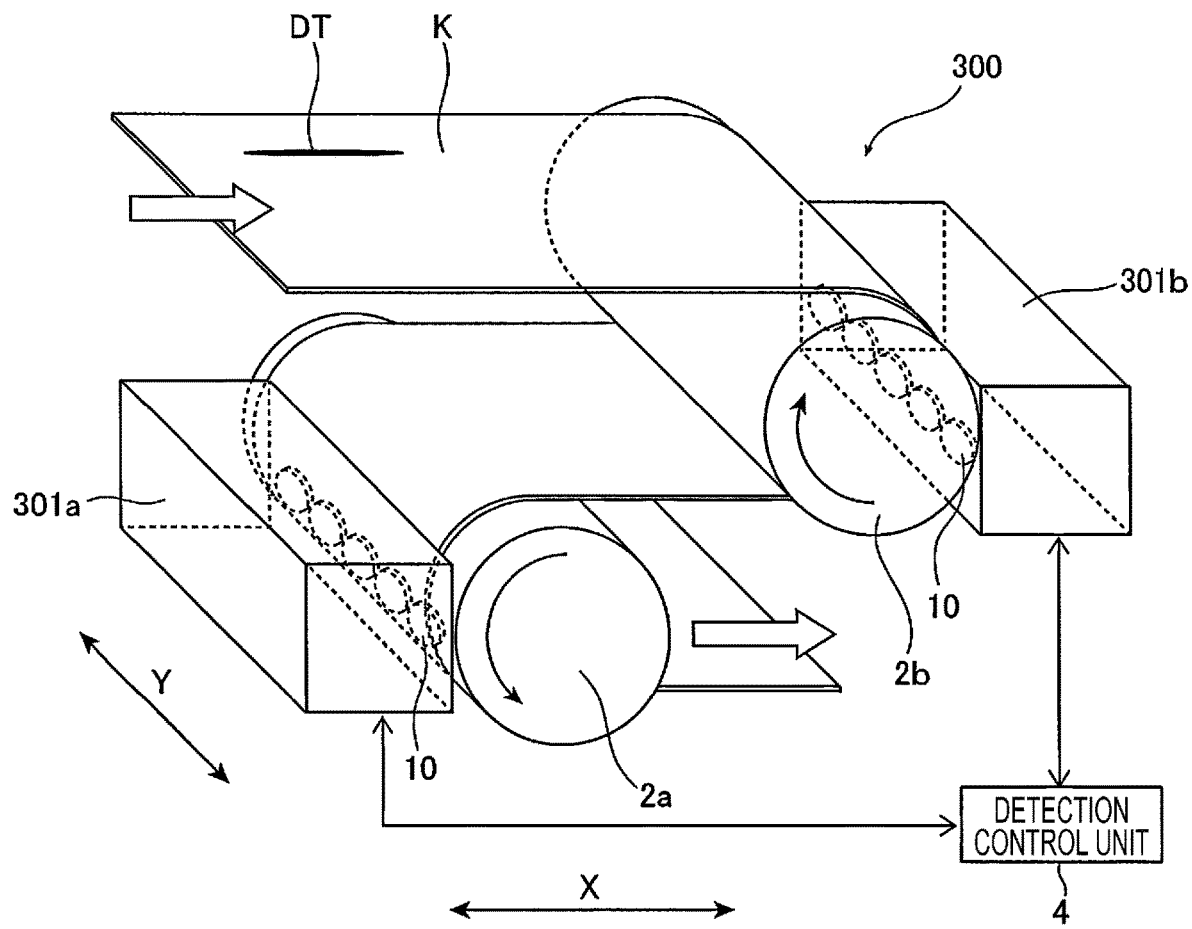
FIG. 11 is a schematic view illustrating a leakage-flux flaw detection device according to a second example.

FIG. 11 is a schematic view illustrating a leakage-flux flaw detection device 300 according to a second example. In this example, the leakage-flux flaw detection device 300 has a storage box 301a disposed to face a steel strip K wound around a non-magnetic roll 2a and traveling. A plurality of leakage-flux flaw detection units 10 are disposed in each storage box 301a. The leakage-flux flaw detection device 300 includes a detection control unit 4 that controls the operations of the plurality of leakage-flux flaw detection units 10 in the storage box and that determines the existence or non-existence of a linear defect based on the leakage flux detected by each of the leakage-flux flaw detection units 10, similarly to the first example.

Figure 12:
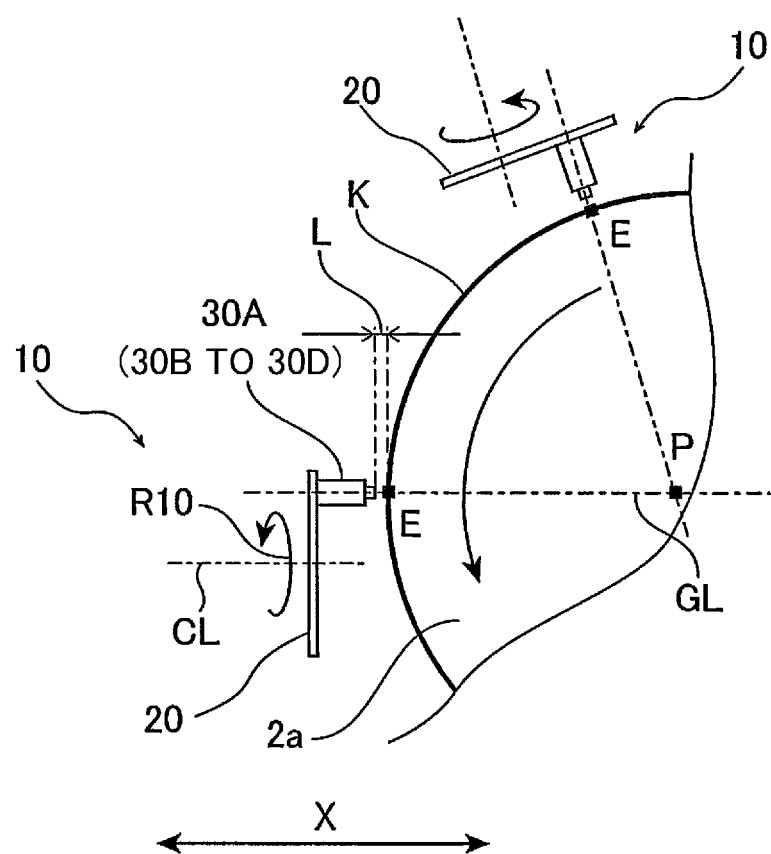
FIG. 12 is a diagram illustrating the relationship between a leakage-flux flaw detection unit and a non-magnetic roll in FIG. 11.

FIG. 12 is a diagram illustrating the relationship between the leakage-flux flaw detection unit 10 and the non-magnetic roll 2a in FIG. 11. In this example, as illustrated in FIG. 12, the leakage-flux flaw detection unit 10 is installed to face a portion of the steel strip K wound around the non-magnetic roll 2a. Specifically, the leakage-flux flaw detection unit 10 is installed so that the rotating disk 20 is parallel to a tangent line of the non-magnetic roll 2a at a point E at which a line GL connecting the defect detection head 30A (or one of 30B to 30D) and the center P of the non-magnetic roll 2a intersects the non-magnetic roll 2a. Also, the leakage-flux flaw detection unit 10 is installed so that, at the point P, the lift-off amount between the defect detection head 30A (or one of 30B to 30D) and the steel strip K is a predetermined value L. Of course, GL and CL are parallel.

Since the steel strip K is brought into close contact with the non-magnetic roll 2a by the tension given in the X direction and the variation in the lift-off amount L is suppressed, the variation in the distance between the steel strip K and the leakage-flux flaw detection units 10 hardly occurs. Consequently, the influence of the variation in the distance can be eliminated when detecting the leakage flux, and extremely stable online flaw detection for the steel strip K can be provided. In addition, a storage box 301b may be installed for a non-magnetic roll 2b different from the non-magnetic roll 2a for which the storage box 301a is installed to detect a linear defect DT in the surface opposite to the surface detected by the storage box 301a. To inspect the entire width of the steel strip K in the second example, the leakage-flux flaw detection unit 10 may be installed at different angles as illustrated in FIG. 12. Alternatively, a storage box may be newly installed for another non-magnetic roll 2.

Examples are not limited to those described above, and various modifications can be added. For example, in each of the above-described examples, the four defect detection heads 30A to 30D are disposed. However, it is sufficient that three or more defect detection heads are provided. Moreover, by providing more than four defect detection heads 30A to 30D, it is possible to perform flaw detection with higher accuracy. Furthermore, in the above-described examples, all the inclination angles β1 to β4 of the four defect detection heads 30A to 30D are different from each other. However, it is sufficient that at least one inclination angle of the plurality of defect detection heads 30A to 30D is different from the inclination angles of the other defect detection heads.

Moreover, in FIG. 3, the plurality of defect detection heads 30A to 30D are installed at equal intervals in the circumferential direction. However, the plurality of defect detection heads 30A to 30D may be installed at different intervals. Furthermore, the plurality of defect detection heads 30A to 30D are installed on the same rotation trajectory RR. However, the plurality of defect detection heads may be installed at different positions in the radial direction.

Moreover, the direction of the linear defect DT is the direction of θ=90° as illustrated in FIG. 3 or FIG. 5. However, my devices are not limited thereto, and can be applied even when the direction of the linear defect DT is inclined with respect to θ=90°. Also in this example, the relationship between the flaw detection angle γ and the relative output value presented in FIG. 7 is basically unchanged.

Moreover, the leakage-flux flaw detection units 10 are disposed in the plurality of rows in the advance direction of the steel strip K in the storage boxes 3a and 3b. However, the leakage-flux flaw detection units 10 may be disposed in one row. When the leakage-flux flaw detection units 10 are disposed in one row, it is required to dispose a plurality of storage boxes in the advance direction of the steel strip K to detect defects in the entire sheet width direction.

Furthermore, in each of the above-described examples, the steel sheet is used for a vehicle body or a component for an automobile. However, the steel sheet can be applied to steel sheets for various wide applications other than an automobile such as an electric appliance.

The invention claimed is:

1. A leakage-flux flaw detection device that detects a linear defect of a steel strip, comprising:
a plurality of leakage-flux flaw detection units provided at positions not in contact with the steel strip and arranged in a width direction of the steel strip,
wherein the leakage-flux flaw detection units each include
a rotating disk that faces a surface subjected to flaw detection of the steel strip and that rotates, and
a plurality of defect detection heads installed at different positions in a circumferential direction on the rotating disk, that perform direct-current magnetization of the steel strip, and detect leakage flux leaking from a linear defect due to the direct-current magnetization,
wherein at least one of the plurality of defect detection heads has an inclination angle different from inclination angles of other defect detection heads, the inclination angle being defined by a tangent line of a rotation trajectory and the magnetization direction at an installation position of the defect detection head.

2. The leakage-flux flaw detection device according to claim 1,
wherein the plurality of defect detection heads detect the linear defect in different regions in the circumferential direction corresponding to the difference in the inclination angles as flaw detectable ranges, and
the leakage-flux flaw detection units have effective flaw detection ranges in the width direction of the steel strip corresponding to the flaw detectable ranges of all the defect detection heads.

3. The leakage-flux flaw detection device according to claim 2, wherein the inclination angles of the plurality of defect detection heads form an overlapping flaw detection range in which adjacent ones of the flaw detectable ranges in the circumferential direction overlap each other.

4. The leakage-flux flaw detection device according to claim 2, wherein the plurality of leakage-flux flaw detection units form an effective overlapping range in which adjacent ones of the effective flaw detection ranges overlap each other.

5. The leakage-flux flaw detection device according to claim 1,
wherein the defect detection heads each include
a magnetizer including two permanent magnets and a yoke that couples an S pole of one of the permanent magnets and an N pole of another one of the permanent magnets to each other, and direct-current-magnetizes the steel strip in a magnetization direction of the yoke, and
a magnetic sensor provided between the two permanent magnets and configured to detect leakage flux leaking from the linear defect.

6. The leakage-flux flaw detection device according to claim 1, wherein the plurality of leakage-flux flaw detection units detect the linear defect while the steel strip travels, and are installed to face a portion of the traveling steel strip wound around a non-magnetic roll.

7. The leakage-flux flaw detection device according to claim 1, wherein the plurality of leakage-flux flaw detection units detect the linear defect while the steel strip travels, and are disposed in a region between two pressing rolls that press the traveling steel strip.

8. The leakage-flux flaw detection device according to claim 1, wherein the plurality of leakage-flux flaw detection units are staggered.

9. The leakage-flux flaw detection device according to claim 1, further comprising a detection control unit that detects existence or non-existence of a linear defect of the steel strip based on detection signals detected by the plurality of leakage-flux flaw detection units.

* * * * *